United States Patent [19]

Buxbaum et al.

[11] 4,154,918

[45] May 15, 1979

[54] THERMOPLASTIC COPOLYESTERS, PROCESSES FOR THEIR PREPARATION AND THEIR USE

[75] Inventors: Lothar Buxbaum, Lindenfels, Fed. Rep. of Germany; Rolf Hügi, Ramlinsburg, Switzerland

[73] Assignee: Ciba-Geigy Corporation, Ardsley, N.Y.

[21] Appl. No.: 922,008

[22] Filed: Jul. 3, 1978

[30] Foreign Application Priority Data

Jul. 7, 1977 [CH] Switzerland ............................ 8428/77

[51] Int. Cl.² ...................... C08G 63/12; C08G 63/18
[52] U.S. Cl. ..................................... 528/176; 260/860; 528/177; 528/178; 528/194; 528/273; 528/300; 528/302
[58] Field of Search ............... 528/176, 177, 178, 194, 528/273, 296, 300, 302, 308, 309; 260/860

[56] References Cited

U.S. PATENT DOCUMENTS

| 3,216,970 | 11/1965 | Conix | 528/176 |
|---|---|---|---|
| 3,669,921 | 6/1972 | Droke et al. | 528/309 X |
| 3,682,863 | 8/1972 | McHale | 528/308 X |
| 3,728,416 | 4/1973 | Akin | 528/176 X |
| 3,926,920 | 12/1975 | Georgoudis et al. | 528/309 X |
| 4,024,111 | 5/1977 | Thomas et al. | 528/296 X |
| 4,071,499 | 1/1978 | Stackman et al. | 528/176 |

*Primary Examiner*—Lucille M. Phynes
*Attorney, Agent, or Firm*—Luther A. R. Hall

[57] ABSTRACT

Thermoplastic copolyesters which have a minimum relative viscosity of 1.7 and contain (a) 35–47.5 mol % of units of terephthalic acid, (b) 15–2.5 mol % of units of isophthalic acid, (c) 10–30 mol % of units of ethylene glycol and (d) 40–20 mol % of units of diethylene glycol, it being possible for up to 9 mol % of the units of ethylene glycol to be replaced by units of a bisphenol dihydroxyalkyl ether, are very suitable as hot-melt adhesives.

9 Claims, No Drawings

THERMOPLASTIC COPOLYESTERS, PROCESSES FOR THEIR PREPARATION AND THEIR USE

The present invention relates to thermoplastic copolyesters obtained from a mixture of aromatic dicarboxylic acids and a mixture of aliphatic diols, processes for their preparation and their use as hot-melt adhesives.

Hot-melt adhesives based on saturated polyesters have already been known for a relatively long time. The diols used in these polyesters are in the main ethylene glycol or 1,4-butanediol and the dicarboxylic acids used are in the main terephthalic acid, in addition to isophthalic acid and aliphatic dicarboxylic acids. Depending on the composition, these polyesters have a spectrum of properties which enables them to be used as hot-melt adhesives in general, not at all or only for specific applications. For certain applications it is, for example, found to be a disadvantage that adequate strength of the adhesive bonds, especially in the case of amorphous polyesters, can be obtained only with relatively high molecular weights. A disadvantage of the high molecular weight polyesters is that wetting of the substrate when they are used as hot-melt adhesives is made more difficult since non-uniform adhesion characteristics of the bond can be obtained.

The object of the present invention is to provide copolyesters for use as hot-melt adhesives, which polyesters, despite having relatively low molecular weights, result in a high and uniform stability of the adhesive bonds, are readily processable and have a relatively high resistance to ageing.

The present invention relates to a thermoplastic copolyester which has a minimum relative viscosity of 1.7, measured at 30° C. on solutions of 1 g of polyester in 100 ml of a solvent consisting of equal parts of phenol and symmetrical tetrachloroethane, and contains condensed units of a mixture of aromatic discarboxylic acids and of aliphatic diols and which contains, based on the polyester, (a) 35–47.5 mol % of units of terephthalic acid, (b) 15–2.5 mol % of units of isophthalic acid, (c) 10–30 mol % of units of ethylene glycol and (d) 40–20 mol % of units of diethylene glycol, it being possible for up to 9 mol % of the units of ethylene glycol to be replaced by units of a bisphenol dihydroxyalkyl ether.

The relative viscosity of the copolyesters is preferably from 1.7 to 4.0, especially 1.9 to 3.0 and in particular 1.9 to 2.5.

Preferably, the copolyester contains (a) 40–45 mol % of units of terephthalic acid and (b) 10–5 mol % of units of isophthalic acid, as well as (c) 12.5–25 mol % of units of ethylene glycol and (d) 37.5–25 mol % of units of diethylene glycol.

In the copolyester according to the invention, up to 9 mol % of the units of ethylene glycol can be replaced by units of a bisphenol dihydroxyalkyl ether.

This bisphenol derivative preferably has the formula

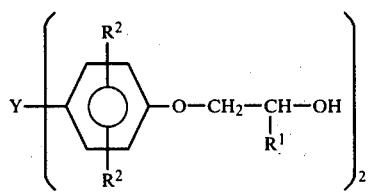

in which $R^1$ is a hydrogen atom, methyl or ethyl, $R^2$ is a hydrogen, chlorine or bromine atom or methyl and Y is substituted or unsubstituted alkylene or alkylidene, cycloalkylidene, a direct bond, O, S or $SO_2$.

$R^1$ in this formula is preferably methyl and especially a hydrogen atom and $R^2$, furthermore, is preferably bonded in the two ortho positions relative to the oxygen atom. In particular $R^2$ is a hydrogen atom.

Examples of substituted or unsubstituted alkylene are: methylene, ethylene, phenylmethylene, diphenylmethylene and methylphenylmethylene.

Examples of substituted or unsubstituted alkylidene are: ethylidene, 1,1- or 2,2-propylidene, butylidene and 1,1-dichloro- or 1,1,1-trichloro-ethylidene.

Examples of cycloalkylidene are: cyclopentylidene, cyclohexylidene, cycloheptylidene and cyclooctylidene.

The bisphenol derivatives are obtained by reacting corresponding bisphenols with ethylene oxide, propylene oxide or butylene oxide.

Examples of bisphenols are: bis-(p-hydroxyphenyl) ether or thioether, bis-(p-hydroxyphenyl)-sulphone, bis-(p-hydroxyphenyl)-methane, 1,2-bis-(p-hydroxyphenyl)-ethane, phenyl-bis-(p-hydroxyphenyl)-methane, diphenyl-bis-(p-hydroxyphenyl)-methane, 2,2-bis-(4'-hydroxy-3'-methylphenyl)-propane, 2,2-bis-(4'-hydroxy-3',5'-dimethylphenyl)-propane, 2,2-bis-(4'-hydroxy-3'-chlorophenyl)-propane, 2,2-bis-(4'-hydroxy-3',5'-dichlorophenyl)-propane, 2,2-bis-(4'-hydroxy-3',5'-dibromophenyl)-propane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and especially 2,2-bis-(p-hydroxyphenyl)-propane (bisphenol A) and 1,1-bis-(p-hydroxyphenyl)-cyclohexane (bisphenol C).

A particularly preferred diol from this group is 2,2-bis-[4'-($\beta$-hydroxyethyl)-phenyl]-propane. 1,1-Bis-[4'-($\beta$-hydroxyethyl)-phenyl]-cyclohexane is also preferred.

A proportion, that is to say 0.025–0.25 and preferably 0.05–0.15 mol %, of the butanediol and/or of the dicarboxylic acids can be replaced by at least trifunctional compounds containing ester-forming functional groups. Ester-forming functional groups are, for example, hydroxyl and carboxyl groups. Examples of such compounds are: glycerol, trimethylolethane, pentaerythritol or trimellitic acid.

The copolyesters according to the invention can be prepared by known processes, by catalytically condensing the dicarboxylic acids or their polyester-forming derivatives together with the diols. In general, the process conditions are chosen so that polyesters are obtained which have a statistical distribution of the monomers. However, it is also possible to follow a procedure such that block polyesters are obtained, by, for example, subjecting precondensates of the homopolyesters (for example polyethylene terephthalate, polyethylene isophthalate and polydiethylene glycol terephthalate) in appropriate quantity ratios to a polycondensation reaction.

Acid-forming derivatives are understood as meaning, for example, the dicarboxylic acid dihalides, preferably the chlorides, and the dicarboxylic acid esters, for example the lower alkyl esters and phenyl esters.

Known embodiments of the process are, for example, solution of azeotropic condensation, interfacial condensation melt condensation or solid phase condensation and also combinations of these methods. More detailed methods are described, for example, in German Offenlegungsschrift No. 2,453,450. The process is generally carried out at temperatures of 50°-300° C., under normal pressure, in vacuo and/or in a stream of inert gas, depending on which monomers are employed.

The polyesters according to the invention are amorphous or difficult to crystallise with melting ranges above about 150° C. and low glass transition temperatures. They are outstandingly suitable as hot-melt adhesives for substrates of diverse types, such as wood, metal, glass, ceramics and plastics, for example in furniture manufacture, in automobile construction, in the manufacture of tin cans, for fixing decorative elements on articles of jewellery, in the electrical or textile industries and also in foundries when sticking sand moulds and in the packaging industry and bookbinding.

Depending on the fields of application, different processing techniques will be used, for example roller application or nozzle application methods (spreading or spraying) above the fusion temperature. It is also possible to apply solutions of the polyesters in suitable solvents to the substrate surfaces and, during or after evaporation of the solvent, such as methylene chloride, to effect bonding at a temperature above the fusion temperature of the polyester. Furthermore, it is also possible first to produce films or filaments from the copolyesters according to the invention and to use these films to coat the substrate surfaces intended to be bonded. Bonding itself is completed by exerting pressure and applying heat.

The polyesters according to the invention can also contain customary additives, for example waxes and plasticisers, for example long-chain aliphatic compounds (fatty alcohols). They can also be used as a mixture with other polymers, for bonding, and in this case the content of copolyester is usually at least 10% by weight, for example 10 to 90% by weight, based on the total composition. Polymers suitable for admixing are, for example, epoxy resins, nitrocellulose, vinyl chloride/vinyl acetate copolymers, isocyanate resins, triazine-formaldehyde resins and polyketones.

The polyesters according to the invention have a balanced spectrum of properties which ensures that they can be used for diverse applications. They impart excellent adhesion, which is to be regarded as surprising since copolyesters with correspondingly low viscosity values frequently impart only lesser adhesion. Adhesive bonds with polyesters according to the invention have a relatively high heat resistance. Furthermore, they are relatively stable to hydrolysis, have a low brittle point and a high resistance to ageing. The outstanding adhesion characteristics manifest themselves especially in the high tensile shear strength and peel strength. The outstanding processability is ensured by improved wetting of the substrate by the low molecular weight copolyesters and surprisingly high adhesions can already be observed.

The polyesters prepared in accordance with the following examples are characterised in more detail by the following characteristic data. The polyesters are characterised by those morphological changes which are measured by means of differential thermoanalysis on a sample which has been heat-treated for 3 minutes at a temperature 30° C. above the melting point or softening point and then rapidly chilled. The chilled sample is heated by means of the Perkin-Elmer "DSC-1B" Differential Scanning Calorimeter at a heating rate of 16° C./minute. The thermogram of the sample shows the glass transition temperature ($T_g$), the crystallisation temperature ($T_c$) and the fusion temperature ($T_f$). The inflection point at the sudden increase in the specific heat in the thermogram is given as the glass transition temperature, the apex of the exothermic peak is given as the crystallisation temperature and the apex of the endothermic peak is given as the fusion temperature. The relative viscosity of the polycondensation products of the examples is determined at 30° C. on solutions of 1 g of polyester in 100 ml of a mixture consisting of equal parts of phenol and tetrachloroethane. The softening temperature is determined on a Kofler heated stage microscope at a heating rate of 15° C./minute, a cross being formed from 2 filaments and the softening temperature being designated as that temperature at which the sharp angles of the cross disappear.

The following test methods are used to characterise the adhesive properties.
 (a) The tensile shear strength is determined in accordance with DIN 53,283.
 (b) The heat resistance is defined as the temperature at which the tensile shear strength according to DIN No. 53,283 falls to a value of 6 N/mm$^2$.
 (c) The residual tensile shear strength after cold water storage is determined by the tensile shear strength after the samples for measurement have been stored for a certain period in water at 23° C.
 (d) The resistance to tropical conditions is obtained by measuring the tensile shear strength after storing the samples in tropical climatic conditions (42° C. and relative atmospheric humidity of 92%). The storage time is indicated.
 (e) The resistance to ageing is obtained by measuring the tensile shear strength of the samples after storing at 40° C., 80° C. and 120° C. for a specific period.
 (f) The peel strength is determined in accordance with Standard Method DTD 5,577.

EXAMPLE 1

3,492 g of dimethyl terephthalate (DMT), 388 g of dimethyl isophthalate (DMI), 1,500 g of ethylene glycol, 2,120 g of diethylene glycol and also 2.6 g of zinc acetate dihydrate and 2.8 g of antimony trioxide are filled into a 10 l reactor provided with a stirrer, a nitrogen inlet, a separating column and a temperature measuring device, and the mixture is heated to 140° C. 98% of the amount of methanol theoretically to be expected is distilled off in the course of 3 hours, with stirring and whilst passing nitrogen into the mixture, and during this time the temperature of the reaction mixture rises to 225° C.

The trans-esterification mixture thus obtained is transferred to a 2nd reactor and, after heating the reaction mixture to 250° C. a vacuum of 70 mm Hg is applied in the course of ½ hour, using a waterpump. The vacuum is increased, using a vacuum pump, to 0.7 mm Hg in the course of 45 minutes, the reaction temperature being raised to 265° C. This reaction temperature is then maintained for 3 hours, during which time the vacuum improves to 0.2 mm Hg. The reactor is then emptied and the resulting polyester, which has a relative viscosity of 2.25, is granulated.

Analysis of this polyester with the aid of nuclear magnetic resonance spectroscopy gives the following composition:

| | |
|---|---|
| terephthalic acid: | 45 mol % |

-continued

| | |
|---|---|
| isophthalic acid: | 5 mol % |
| ethylene glycol: | 25 mol % |
| diethylene glycol: | 25 mol % |

With regard to the use of the polyester as a hot-melt adhesive, the following characteristics are measured:

| | |
|---|---|
| tensile shear strength (20° C.) (N/mm$^2$): | 13.7 |
| peel strength (N/mm): | 2-3 |
| heat resistance (° C.): | 40 |
| residual tensile shear strength: | |
| after storing in water for 90 days: (N/mm$^2$) | 10.7 |

Tensile shear strength/temperature dependence

| T (° C.) | Tensile shear strength (N/mm$^2$) |
|---|---|
| −60 | 12.0 |
| −40 | 10.7 |
| −20 | 10.9 |
| 0 | 10.7 |
| 20 | 13.7 |
| 40 | 14.3 |
| 60 | 3.1 |
| 80 | 1.3 |
| 100 | 0.7 |
| 120 | 0.5 |

Resistance to tropical conditions/dependence on time

| | Tensile shear strength (N/mm$^2$) |
|---|---|
| 0 days | 13.7 |
| 10 days | 11.5 |
| 30 days | 14.0 |

| Resistance to ageing at 80° C. Time | Tensile shear strength (N/mm$^2$) |
|---|---|
| 0 days | 13.7 |
| 10 days | 11.2 |
| 30 days | 10.2 |
| 60 days | 9.8 |

EXAMPLE 2

2,804 g of DMT, 1,078 g of DMI, 1,480 g of ethylene glycol, 1,700 g of diethylene glycol, 1,260 g of hydroxyethylated bisphenol A and also 2.6 g of zinc acetate dihydrate and 2.8 g of antimony trioxide are filled into a 10 l reactor provided with a stirrer, a nitrogen inlet, a separating column and a temperature measuring device, and the mixture is heated to 140° C. 98% of the amount of methanol theoretically to be expected is distilled off in the course of 3 hours, with stirring and whilst passing nitrogen into the mixture, and during this time the temperature of the reaction mixture rises to 255° C.

The trans-esterification product thus obtained is transferred to a 2nd reactor and, after heating the reaction mixture to 243° C., a vacuum of 70 mm Hg is applied in the course of ½ hour, using a waterpump. The vacuum is increased, using a vacuum pump, to 0.7 mm Hg in the course of 45 minutes, the reaction temperature being raised to 260° C. The reaction temperature is now maintained for 3½ hours, during which time the vacuum improves to 0.2 mm Hg. The reactor is then emptied and the resulting polyester, which has a relative viscosity of 2.06, is granulated.

The composition of the polyester thus obtained, determined with the aid of nuclear magnetic resonance spectroscopy, gave the following values:

| | |
|---|---|
| terephthalic acid: | 36 mol % |
| isophthalic acid: | 14 mol % |
| ethylene glycol: | 12 mol % |
| diethylene glycol: | 29 mol % |
| 2,2-bis-[4'-(β-hydroxyethoxy)-phenyl]-propane: | 9 mol % |

The following characteristics were determined for this polyester:

| | |
|---|---|
| tensile shear strength (20° C.) (N/mm$^2$): | 16.9 |
| peel strength (N/mm): | 2-3 |
| heat resistance (° C.): | 60 |
| residual tensile shear strength after storing in water for 90 days (N/mm$^2$): | 12.6 |

Tensile shear strength/temperature dependence

| T (° C.) | Tensile shear strength (N/mm$^2$) |
|---|---|
| −60 | 15.0 |
| −40 | 11.0 |
| −20 | 12.8 |
| 0 | 13.5 |
| 20 | 16.9 |
| 40 | 17.9 |
| 60 | 9.5 |
| 80 | 2.9 |
| 100 | 1.7 |
| 120 | 0.2 |

Resistance to tropical conditions/dependence on time

| Time | Tensile shear strength (N/mm$^2$) |
|---|---|
| 0 days | 16.9 |
| 10 days | 14.8 |
| 30 days | 16.1 |

| Resistance to ageing at 80° C. | Tensile shear strength (N/mm$^2$) |
|---|---|
| 0 days | 16.9 |
| 10 days | 14.2 |
| 30 days | 14.5 |
| 60 days | 15.9 |

EXAMPLE 3

184.3 g of DMT, 62 g of ethylene glycol, 106 g of diethylene glycol, 25.3 g of hydroxyethylated bisphenol A and also 0.129 g of zinc acetate dihydrate and 0.138 g of antimony trioxide are filled into a 2 l reactor provided with a stirrer, a nitrogen inlet and a distillation column, and the mixture is heated to 200° C. 98% of the amount of methanol theoretically to be expected is distilled off in the course of 3 hours, with stirring and whilst passing nitrogen into the mixture.

After adding 8.3 g of isophthalic acid and after heating the reaction mixture to 240° C., a vacuum of 70 mm Hg is applied in the course of ½ hour using a waterpump. The vacuum is increased, using a vacuum pump, to 0.7 mm Hg in the course of 15 minutes, the reaction temperature being raised to 270° C. The reaction temperature is now maintained for 2½ hours, during which time the vacuum improves to 0.15 mm Hg. The reactor is then emptied and a polyester with a relative viscosity of 2.02 is obtained.

The composition of the polyester thus obtained, determined with the aid of nuclear magnetic resonance spectroscopy, gave the following values:

| terephthalic acid: | 47.5 mol % |
|---|---|
| isophthalic acid: | 2.5 mol % |
| ethylene glycol: | 21.5 mol % |
| diethylene glycol: | 25.0 mol % |
| 2,2-bis-[4'-(β-hyddroxyethoxy)-phenyl]-propane: | 3.5 mol % |

The following hot-melt adhesive characteristics were measured:

| Tensile shear strength (N/mm$^2$): | |
|---|---|
| DIN 53,283 (room temperature) | 12.0 |
| after storing in water for 30 days: | 10.0 |
| at 23° C. | |
| after ageing for 10 days at 80° C.: | 12.7 |
| after ageing for 30 days at 80° C.: | 13.3 |

EXAMPLE 4

155.2 g of dimethyl terephthalate (DMT), 93 g of ethylene glycol, 106 g of diethylene glycol and also 0.127 g of zinc acetate dihydrate and 0.135 g of antimony trioxide are filled into a 2 l reactor provided with a stirrer, a nitrogen inlet and a distillation column, and the mixture is heated to 200° C. 97% of the amount of methanol theoretically to be expected is distilled off in the course of 3 hours, with stirring and whilst passing nitrogen into the mixture.

After adding 33.2 g of isophthalic acid and after heating the reaction mixture to 250° C., a vacuum of 70 mm Hg is applied in the course of ½ hour using a waterpump. The vacuum is increased, using a vacuum pump, to 0.7 mm Hg in the course of 15 minutes, the reaction temperature being raised to 270° C. This reaction temperature is then maintained for 2 hours and during this time the vacuum improves to 0.1 mm Hg. The reactor is then emptied and a polyester with a relative viscosity of 2.20 is obtained.

Analysis of this polyester with the aid of nuclear magnetic resonance spectroscopy gives the following composition:

| terephthalic acid: | 40.0 mol % |
|---|---|
| isophthalic acid: | 10.0 mol % |
| ethylene glycol: | 25.5 mol % |
| diethylene glycol: | 24.5 mol % |

With regard to the use of the polyester as a hot-melt adhesive, the following characteristics are measured:

| Tensile shear strength (N/mm$^2$): | 14.2 |
|---|---|
| DIN 53,283 (room temperature) | |
| after storing in water for 30 days: | 11.5 |
| at 23° C. | |
| after ageing for 10 days at 80° C.: | 10.0 |
| after ageing for 30 days at 80° C.: | 8.0 |

What is claimed is:

1. A thermoplastic copolyester which has a minimum relative viscosity of 1.7, measured at 30° C. on a solution of 1 g of polyester in 100 ml of a solvent consisting of equal parts of phenol and symmetrical tetrachloroethane, and contains condensed units of a mixture of aromatic dicarboxylic acids and also of aliphatic diols, and which contains, based on the polyester, (a) 35–47.5 mol % of units of terephthalic acid, (b) 15–2.5 mol % of units of isophthalic acid, (c) 10–30 mol % of units of ethylene glycol and (d) 40–20 mol % of units of diethylene glycol, it being possible for up to 9 mol % of the units of ethylene glycol to be replaced by units of a bisphenol dihydroxyalkyl ether.

2. A copolyester according to claim 1, which has a relative viscosity of 1.7 to 4.0.

3. A copolyester according to claim 1, which contains (a) 40–45 mol % of units of terephthalic acid and (b) 10–5 mol % of units of isophthalic acid.

4. A copolyester according to claim 1, which contains (c) 12.5–25 mol % of units of ethylene glycol and (d) 37.5–25 mol % of units of diethylene glycol.

5. A copolyester according to claim 1, wherein the bisphenol dihydroxyalkyl ether is 2,2-bis-[4'-(β-hydroxyethoxy)-phenyl]-propane or 1,1-bis-[4'-(β-hydroxyethoxy)-phenyl]-cyclohexane.

6. A copolyester according to claim 1, wherein 0.025–0.25 mol % of the dicarboxylic acids and/or diols (a) to (d) has been replaced by at least trifunctional polyester-forming monomers.

7. A copolyester according to claim 2 which has a relative viscosity of 1.9 to 3.0.

8. A copolyester according to claim 7 which has a relative viscosity of 1.9 to 2.5.

9. A hot-melt adhesive comprising a copolyester according to claim 1.

* * * * *